(12) United States Patent
Chai et al.

(10) Patent No.: US 8,809,463 B2
(45) Date of Patent: Aug. 19, 2014

(54) METHOD OF PREPARING RUBBER LATEX HAVING HIGH POLYMERIZATION STABILITY

(71) Applicant: LG Chem, Ltd., Seoul (KR)

(72) Inventors: Joo Byung Chai, Daejeon (KR); Yu Sung Jung, Daejeon (KR); Won Deok Han, Daejeon (KR); Keun Hoon Yoo, Daejeon (KR); Chan Hong Lee, Daejeon (KR); Tae Young Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/009,640

(22) PCT Filed: Nov. 9, 2012

(86) PCT No.: PCT/KR2012/009477
§ 371 (c)(1),
(2), (4) Date: Oct. 3, 2013

(87) PCT Pub. No.: WO2013/073800
PCT Pub. Date: May 23, 2013

(65) Prior Publication Data
US 2014/0080976 A1    Mar. 20, 2014

(30) Foreign Application Priority Data

Nov. 17, 2011 (KR) .................. 10-2011-0120354
Aug. 27, 2012 (KR) .................. 10-2012-0093673

(51) Int. Cl.
| | | |
|---|---|---|
| C08F 265/02 | (2006.01) | |
| C08F 236/06 | (2006.01) | |
| C08F 279/02 | (2006.01) | |
| C08F 291/02 | (2006.01) | |
| C08F 291/06 | (2006.01) | |
| C08F 291/12 | (2006.01) | |
| C08F 265/04 | (2006.01) | |
| C08F 265/06 | (2006.01) | |
| C08F 20/10 | (2006.01) | |
| C08F 2/22 | (2006.01) | |
| C08F 279/04 | (2006.01) | |
| C08L 9/10 | (2006.01) | |
| C08L 51/04 | (2006.01) | |

(52) U.S. Cl.
CPC ............. *C08F 236/06* (2013.01); *C08F 279/02* (2013.01); *C08F 291/02* (2013.01); *C08F 291/06* (2013.01); *C08F 291/12* (2013.01); *C08F 265/04* (2013.01); *C08F 265/06* (2013.01); *C08F 265/02* (2013.01); *C08F 20/10* (2013.01); *C08F 2/22* (2013.01); *C08F 279/04* (2013.01); *C08L 9/10* (2013.01); *C08L 51/04* (2013.01)
USPC .......................................................... 525/243

(58) Field of Classification Search
CPC .... C08F 265/02; C08F 265/04; C08F 265/06; C08F 291/02; C08F 291/06; C08F 291/12; C08L 51/003; C08L 51/04
USPC .......................................................... 525/243
See application file for complete search history.

(56) References Cited

U.S. PATENT DOCUMENTS

2010/0113646 A1*  5/2010  Bardman et al. .............. 523/201

FOREIGN PATENT DOCUMENTS

| JP | 2010-150301 | 7/2008 |
| KR | 10-0600552 B1 | 7/2006 |
| KR | 10-0787338 B1 | 12/2007 |
| KR | 10-0809245 B1 | 2/2008 |
| KR | 10-1061874 B1 | 9/2011 |

* cited by examiner

*Primary Examiner* — Edward Cain
(74) *Attorney, Agent, or Firm* — McKenna Long & Alridge, LLP

(57) ABSTRACT

Disclosed is a method for preparing a rubber latex which includes adding a basic solution to an initial reaction hydrophilic monomer and a small amount of fat-soluble monomer when a polymerization conversion ratio is 90% or more to form particles having a small diameter and superior stability, ionizing an end of the particles to secure stability of the particles and growing the formed particles, and thereby obtains a stable latex with a large particle diameter using a minimal amount of emulsifying agent and minimizes gas generation and heat discoloration derived from the emulsifying agent.

14 Claims, No Drawings

METHOD OF PREPARING RUBBER LATEX HAVING HIGH POLYMERIZATION STABILITY

This application is a National Stage Application of International Patent Application No. PCT/KR2012/009477, filed Nov. 9, 2012, and claims the benefit of Korean Patent Application No. 10-2011-0120354 filed on Nov. 17, 2011, and Korean Patent Application No. 10-2012-0093673 filed on Aug. 27, 2012, in the Korean Intellectual Property Office, the disclosures of which are incorporated herein by reference.

TECHNICAL FIELD

The present invention relates to a method for preparing a rubber latex. More specifically, the present invention relates to a method for preparing a rubber latex which includes adding a basic solution to an initial reaction hydrophilic monomer and a small amount of fat-soluble monomer when a polymerization conversion ratio is 90% or more to form particles having a small diameter and superior stability, ionizing an end of the particles to secure stability of the particles and growing the formed particles, and thereby obtains a stable latex with a large particle diameter using a minimal amount of emulsifying agent and minimizes gas generation and heat discoloration derived from the emulsifying agent.

BACKGROUND ART

In general, emulsion polymerization is widely used in a variety of industrial fields such as materials for coating, impact resistant materials and materials for medicines due to advantages in that it can easily obtain a high molecular weight and various spherical particles and can variably implement particle structures such as core-shell structures and porous structures, unlike bulk polymerization and solution polymerization. In particular, rubber-reinforced thermoplastic resins used in fields requiring impact resistance include materials such as ABS, MBS, ASA, ATM and the like.

These materials are generally obtained by preparing a spherical rubber polymer by emulsion polymerization and copolymerizing inside and outside rubber particles with a different kind of monomer in consideration dispersability of the prepared rubber polymer with a matrix resin (for example, SAN, PVC, PET, PC or the like). Commonly, final products are manufactured via high-temperature molding processes, so-called, extrusion and injection, with a matrix resin. In particular, ABS products are applied to fields requiring superior impact resistance and excellent outer appearance owing to superior impact resistance, gloss, coloring properties and the like.

DISCLOSURE

Technical Problem

The preparation of rubber polymers and rubber graft copolymers by emulsion polymerization entails use of a great amount of emulsifying agent, in order to form particles and secure polymerization stability during polymerization, unlike bulk polymerization or solution polymerization. The emulsifying agent used, in particular, emulsifying agent remaining in final products, may cause fatal problems upon formation at high temperatures. Representative problems include gas generation, heat discoloration, and deterioration in surface gloss upon high-temperature processing. These problems greatly restrict use of resins obtained by emulsion polymerization.

In academia and industry, a variety of methods have been attempted in order to overcome these disadvantages of emulsion polymerization. Examples of the methods broadly include minimization of an amount of emulsifying agent remaining in final polymers by reducing a conventional amount of emulsifying agent used, removal of generated gas by addition of absorbent during processing, reduction of amount of residual emulsifying agent by reinforcing washing in the process of solidifying (aggregating and dehydrating) an emulsion polymerization latex, and reduction of a ratio of gasified emulsifying agent by using a monomer-type reactive emulsifying agent which is copolymerizable with a monomer. These methods are effective to some extent, but the effects are unsatisfactory when considering manufacture process complexity and additional costs.

In particular, as the method for reducing a residual emulsifying agent by reducing an amount of emulsifying agent used, selection of polymerization methods minimizing use of an emulsifying agent and application of alternative emulsifying agent with superior stability have been considered. However, these methods involve a considerably limited reduction level of emulsifying agent in order to secure effective emulsion stability, and have slight effects. When the reduction level of emulsifying agent increases, disadvantageously, formation of initial particles is insufficient, the overall reaction rate is deteriorated, and polymerization yield as well as stability of final polymer latex is deteriorated. Furthermore, there is a difficulty in securing emulsion stability using expensive reactive emulsifying agents utilized in academia and industry, when used alone, due to the disadvantage of deterioration in emulsion stability upon formation of initial particles in terms of reduction of amount of emulsifying agent. In addition, there is a difficulty in effectively reducing gas generation of final products through unreacted reactive emulsifying agent due to selectivity of monomers used for polymerization with respect to copolymerization reaction.

Technical Solution

Therefore, the present invention has been made in view of the above problems, and it is one object of the present invention to provide an emulsion polymerization method which minimizes an amount of emulsifying agent used and in particular, a polymerization method which enables easy formation of initial reaction particles in spite of using a small amount of emulsifying agent and secures polymerization stability of polymer when a rubber polymer having a glass transition temperature of 0° C. or less is prepared by emulsion polymerization.

It is another object of the present invention to provide a technical method which minimizes gas generation and heat discoloration derived from an emulsifying agent when a rubber-reinforced thermoplastic resin composition is processed under high-temperature conditions.

These objects of the present invention can be accomplished by the present invention described below.

In accordance with one aspect of the present invention, provided is a method for preparing a rubber polymer having a glass transition temperature of 0° C. by emulsion polymerization comprising (a) performing polymerization in the presence of 5 to 30 parts by weight of a unsaturated carboxylic acid derivative, 0.1 to 1.0 parts by weight of an emulsifying agent, 0.05 to 2.5 parts by weight of a polymerization initiator and 0.1 to 0.5 parts by weight of a molecular weight modifier, with respect to 100 parts by weight of a total monomer, and continuously adding 5 to 10 parts by weight of a basic solution thereto to prepare a seed polymer having a particle diameter of 500 to 1,500 Å, and (b) continuously adding 5 to 20 parts by weight of the seed polymer, 80 to 95 parts by weight of a monomer, 0.1 to 1.0 parts by weight of a polymerization initiator and 0.1 to 0.5 parts by weight of an emulsifying agent and performing polymerization to grow the seed polymer into a particle diameter of 2,500 to 3,500 Å.

In accordance with another aspect of the present invention, provided is a method for preparing a rubber-reinforced graft copolymer comprising preparing a polymer having a core-shell structure by emulsion-polymerizing a mixture comprising 50 to 70 parts by weight of the rubber polymer, and 30 to 50 parts by weight of at least one monomer selected from the group consisting of a vinyl aromatic compound, a vinyl cyanide compound and a (meth)acrylic acid ester compound.

BEST MODE

Hereinafter, the present invention will be described in detail.

In order to accomplish the objects described above, the present invention provides preparation of a rubber polymer having a glass transition temperature (Tg) of 0° C. or less, and a rubber-reinforced graft copolymer and a rubber-reinforced thermoplastic resin composition using the same.

A great deal of research is repeated in order to secure suitable polymerization stability and polymerization rate in spite of using a small amount of emulsifying agent. As a result, a method which obtains a stable latex without deterioration in polymerization rate even in the presence of a small amount of emulsifying agent has been developed. This method conforms to the following polymerization method. First, a stable latex with a large particle diameter can be obtained using a minimal amount of emulsifying agent via a method including forming particles having a small diameter in the presence of an initial reaction hydrophilic monomer and a small amount of fat-soluble monomer, securing stability of particles through ionization of an end and then growing the formed particles.

Products developed by this method are characterized in that an absolute amount of the emulsifying agent contained in final polymers is considerably small. The product, in particular, a product obtained using this method for the preparation of a rubber polymer, exhibits superior polymerization stability and high reaction rate even in the presence of a small content of emulsifying agent, and a graft copolymer using a rubber polymer solves problems associated with outer appearance quality during processing such as gas generation and heat discoloration derived from residual emulsifying agent.

The preparation of the rubber polymer having a glass transition temperature (Tg) of 0° C. or less, and configurations of a rubber-reinforced graft copolymer and a rubber-reinforced thermoplastic resin composition using the same are given below. Steps provided by the present invention are only given as an example, polymerization is not necessarily performed in the exact order in which the respective steps are given and polymerization may be performed by a continuous polymerization step.

Hereinafter, the present invention will be described in more detail.

A) Preparation of Rubber Polymer a) Preparation of Seed Polymer

Regarding emulsion polymerization, formation of initial particles is an essential step which determines a polymerization rate and controls a particle diameter of a final latex and the method for preparing the seed polymer provided by the present invention will be given below.

First, 100 parts by weight of a monomer, 0.1 to 1.0 parts by weight of an emulsifying agent, 0.05 to 2.5 parts by weight of a polymerization initiator, 0.1 to 0.5 parts by weight of a molecular weight modifier, 5 to 30 parts by weight of a unsaturated carboxylic acid derivative and 50 to 150 parts by weight of an ion exchange water are polymerized, and 5 to 10 parts by weight of a basic solution is continuously added to the polymerization reaction product while stirring, when a polymerization conversion ratio is 90% or more, to obtain a latex having a pH of 10 or more. A mean particle diameter of the obtained polymer is 500 to 1,500 Å and a ratio of the polymer to a polymerization coagulum is lower than 0.001%, based on total content of solids added.

Examples of useful monomers include diene monomers such as 1,3-butadiene, isoprene, 2-chloro-1,3-butadiene and chloroprene, acrylic acid ester monomers such as methyl acrylate, ethyl acrylate, butyl acrylate, 2-ethylhexyl acrylate, and aromatic vinyl compound monomers such as styrene, alpha-methyl styrene, chlorostyrene and vinyl toluene, vinyl cyanide compound monomers such as acrylonitrile, methacrylonitrile, malononitrile and the like. These monomers may be used alone or in combination thereof.

As the monomer, 100 parts by weight of a diene monomer, or 100% parts by weight of a monomer mixture comprising 50 to 90% by weight of the diene monomer and 10 to 50% by weight of at least one monomer selected from the group consisting of an acrylic acid ester monomer, an aromatic vinyl compound monomer and a vinyl cyanide compound monomer is preferably subjected to emulsion polymerization.

Examples of the unsaturated carboxylic acid derivative that can be used in the polymerization step include acrylic acid, maleic acid, methacrylic acid, itaconic acid, fumaric acid and the like. The derivative may be added in a batch manner at an initial reaction stage, or may be added in a portion-wise manner, that is, 40 to 60% by weight of the unsaturated carboxylic acid derivative is first added at an initial reaction stage and 40 to 60% by weight thereof is further added when a reaction conversion ratio is 40% to 60%. The present invention is not greatly limited to the method for adding the monomer at a later reaction stage and the monomer may be added in a continuous addition manner.

A content of the unsaturated carboxylic acid derivative added during reaction is preferably 5 to 30 parts by weight, with respect to 100 parts by weight of a total initial monomer. When the content of the unsaturated carboxylic acid derivative is lower than 5 parts by weight, it is not easy to secure latex polymerization stability and storage stability, and when the content thereof exceeds 30 parts by weight, rubber latex is unsuitable for use as an impact resistant material due to excessive increase in Tg and effective growth of particles is difficult in the process of growing particles of rubber latex.

The emulsifying agent that can be used for the preparation step may be a generally used sulfuric acid ester-type emulsifying agent or sulfonate-type emulsifying agent. Examples of the sulfuric acid ester-type emulsifying agent include emulsifying agents having a structure of sodium lauryl sulfate, sodium dodecyl sulfate, sodium lauryl ether sulfate, sodium dodecyl benzene sulfate, alkyl sulfate, and alkyl ether sulfate or alkyl phenyl ether sulfate containing a polyoxyethylene repeat group. Examples of useful sulfonate-type emulsifying agents include alkyl benzene sulfonate, alkyl sulfonate and dialkyl sulfosuccinate emulsifying agents. In addition, carboxylate-type emulsifying agents such as potassium rosinate, potassium fatty acid and potassium alkenyl dicarboxylate may be used. Furthermore, the absorbent emulsifying agent may be used alone or in combination with a non-ionic emulsifying agent. When the absorbent emulsifying agent is used in combination with an non-ionic emulsifying agent containing an ethylene oxide group, the non-ionic emulsifying agent is preferably used in a content of 10 to 20% by weight, with respect to the total content of the emulsifying agent in order to secure latex stability during polymerization reaction.

The basic solution that can be used for the present invention is preferably a strong basic aqueous solution such as sodium hydroxide or potassium hydroxide, more preferably, a 0.1 to 30 wt %, 5 to 20 wt % or 5 to 10 wt % dilute solution of a strong base in ion exchange water. The addition is not greatly limited, but is preferably a continuous addition method. The addition of the basic solution is preferably performed at an ordinary reaction temperature of 60° C. to 80° C. and is performed when a polymerization conversion ratio is 90% or more, more specifically, 90% to 95%. When the polymerization conversion ratio of addition time is lower than 90%, the unreacted unsaturated carboxylic acid derivative is saponified in a continuous aqueous phase, polymerization stability of the seed polymer and copolymerization properties of unsaturated carboxylic acid may be deteriorated, and it may be difficult to secure effective polymerization stability at a later reaction particle growth stage.

The polymerization initiator that can be used for the present reaction may be a highly hydrophilic persulfate-based initiator, and specific examples thereof include pyrolytic initiators such as potassium persulfate, ammonium persulfate and sodium persulfate. Preferably, in a seed polymerization step, a highly hydrophilic polymerization initiator is used in an amount of 0.05 to 2.5 parts by weight. When the content of the polymerization initiator is lower than 0.05 parts by weight in a seed polymer preparation step, polymerization initiation reaction may be delayed and polymerization rate may be decreased, and when the content of the polymerization initiator exceeds 2.5 parts by weight, an initial polymerization rate is excessively high, the number of seeds having a small particle diameter is great due to heating upon polymerization and polymerization stability may be thus deteriorated.

Examples of the molecular weight modifier that can be used for polymerization include mercaptans such as n-dodecyl mercaptan, n-decyl mercaptan, and t-dodecyl mercaptan and molecular weight modifiers useful for common emulsion polymerization such as alpha methyl styrene dimers. An amount of the molecular weight modifier used is preferably 0.1 to 0.5 parts by weight with respect to 100 parts by weight of a total monomer. When the content of the molecular weight modifier is lower than 0.1 parts by weight, the polymerization rate is deteriorated, cross-linkage degree of rubber polymer is increased and impact strength of an impact resistant material may be deteriorated, and when the content of the molecular weight modifier exceeds 0.5 parts by weight, production efficiency may be deteriorated due to decrease in reaction later polymerization rate, and disgusting odor and gas generation may be derived from residual molecular weight modifier.

b) Particle Growth

The particle growth step includes continuously adding a monomer to initially formed emulsion polymerization particles to induce growth of particles and thereby obtain a desired particle diameter. In the present step, a possible addition is given below.

First, the desired particles are obtained by continuously adding 80 to 95 parts by weight of a monomer, 0.1 to 1.0 parts by weight of a polymerization initiator, 0.1 to 0.5 parts by weight of an emulsifying agent, and 50 to 150 parts by weight of an ion exchange water to 5 to 20 parts by weight of the seed latex prepared in the step a) at a reaction temperature 60 to 80° C. The monomer that can be used for the polymerization step is the same as the monomer used for seed polymerization. As the polymerization initiator, a pyrolytic initiator or a peroxide-based initiator using an oxidation-reduction catalyst may be used. A highly hydrophobic polymerization initiator is more preferable than a highly hydrophilic peroxide-based polymerization initiator. The pyrolytic initiator includes succinic peroxide, lauroyl peroxide, stearoyl peroxide, tertiary hexyl peroxy-2-ethyl hexanoate, tertiary butyl peroxy-2-ethyl hexanoate, benzoyl peroxide and the like, which have a 60° C. half-life period of less than 100 hours. As the oxidation-reduction initiator, a hydroperoxide-based initiator such as diisopropylbenzene hydroperoxide, cumene hydroperoxide or tertiary butyl hydroperoxide, described regarding seed polymerization may be used in combination with a commonly used oxidation-reduction catalyst such as ferrous sulfate, dextrose, sodium pyrophosphate or sodium sulfite.

B) Preparation of Rubber-Reinforced Graft Copolymer

The rubber polymer prepared by the method A) forms a shell layer by graft copolymerization reaction using emulsion polymerization and a method for preparing a graft copolymer will be described in detail.

The graft copolymer is generally prepared by emulsion-polymerizing a monomer comprising 30 to 50 parts by weight of a vinyl aromatic compound, a vinyl cyanide compound or a (meth)acrylic acid ester compound, with respect to 50 to 70 parts by weight of the rubber polymer, and the vinyl cyanide compound or (meth)acrylic acid ester compound may be used in an amount of 10 to 40% by weight with respect to 100 parts by weight of the total monomer used for a shell copolymer.

Examples of useful vinyl aromatic compounds include α-methyl styrene, o-ethyl styrene, p-ethyl styrene and vinyl toluene, and a monomer such as acrylonitrile or methacrylonitrile may be used as the vinyl cyanide compound. The (meth)acrylic acid ester is methacrylic acid ester or acrylic acid ester, methyl methacrylate or ethyl methacrylate may be used as the methacrylic acid ester, and a monomer such as methyl acrylate, ethyl acrylate or butyl acrylate may be used as the acrylic acid ester.

The method for preparing the graft copolymer by emulsion polymerization is not particularly limited, but include generally adding 30 to 50 parts by weight of a monomer for forming the graft copolymer, with respect to 50 to 70 parts by weight of the rubber polymer, together with an emulsifying agent, a molecular weight modifier, a grafting aid and an initiator, and then continuing reaction until a reaction conversion ratio reaches 98 to 99%.

As the emulsifying agent, a carboxylate absorbent emulsifying agent such as potassium rosinate, potassium fatty acid or potassium alkenyl dicarboxylate, a sulfonate absorbent emulsifying agent such as sodium lauryl sulfate or alkyl benzene sulfonate, or a reactive emulsifying agent may be used alone or in combination thereof.

Examples of the molecular weight modifier used for preparation of the graft copolymer include molecular weight modifiers such as n-dodecyl mercaptan, t-dodecyl mercaptan and alpha methyl styrene dimer. Preferably, tertiary dodecyl mercaptan is used in an amount of 0.2 to 1.0 parts by weight.

The initiator may be used in an amount of 0.01 to 1 parts by weight, and the initiator that can be used in the present invention is not particularly limited and is preferably a combination of a peroxide initiator such as tertiary butyl hydroperoxide, cumene hydroperoxide, or diisopropylbenzene hydroperoxide, with an oxidation-reduction catalyst in that it is advantageous to secure impact resistance and latex stability upon graft copolymerization.

The grafting aid may be used in an amount of 0.05 to 0.5 parts by weight and examples thereof include compounds containing two or more unsaturated double bonds enabling radical polymerization, such as divinyl benzene, allyl methacrylate, diallyl phthalate, ethylene glycol diacrylate, triethylene diacrylate, tetraethylene diacrylate, polyethylene glycol diacrylate, and polyethylene glycol dimethacrylate. The grafting aid is preferably used in an amount of 0.1 to 0.3 parts by weight in order to obtain an effective graft ratio at a high rubber content.

Furthermore, the addition method of monomer upon the preparation of the graft copolymer may be selected from direct addition of a monomer emulsion, addition of a monomer mixture, and addition of a monomer emulsion prepared by mixing an emulsifying agent, water and an initiator. Upon the monomer addition, 0 to 20% by weight of the monomer may be added in an initial reaction stage in a batch addition manner and the remaining monomer may be then added in a continuous addition manner. In addition, the total amount of monomer may be continuously added or may be batch added three or four times at an interval.

After generally used anti-oxidant and heat stabilizer are added to the graft copolymer obtained after reaction completion, the graft copolymer is aggregated by an acid such as sulfuric acid, hydrochloric acid, phosphoric acid or acetic acid, or a metal salt such as calcium chloride, magnesium sulfate or aluminum sulfate to provide a solid, or the solid is washed, dehydrated and dried to obtain a power. The powdery graft copolymer may be generally used in combination with a thermoplastic resin copolymer prepared by solution polymerization.

C) Preparation of Rubber-Reinforced Thermoplastic Resin Composition

The graft copolymer prepared by the method described above is commonly melted and mixed with a thermoplastic resin through an extrusion process and is molded into a pellet to prepare a final rubber-reinforced thermoplastic resin. The thermoplastic resin used herein may be an acrylonitrile-styrene copolymer (SAN), an acrylonitrile-styrene-methyl methacrylate (AMS) resin, a polycarbonate (PC) resin, a polybutylene terephthalate (PBT) resin, or a polyvinyl chloride (PVC) resin. There is no great limitation as to the resin and any resin may be freely used in a case in which impact resistance is required.

Furthermore, when the graft copolymer B) is melt-molded with the thermoplastic resin by extrusion and injection processes, a lubricant, a heat stabilizer and other additives for processes may be added and kinds thereof are not greatly limited.

The rubber-reinforced thermoplastic resin composition prepared by the method described above exhibits superior impact resistance unlike a conventional preparation method, and is excellent in sensible properties such as high-temperature molding heat stability and gloss, as compared to conventional resins.

Now, preferred examples will be given below for a better understanding of the present invention. These examples are provided only to illustrate the present invention and those skilled in the art will appreciate that various alterations and modifications are possible, without departing from the scope and spirit of the invention as disclosed in the accompanying claims.

EXAMPLE

Example 1

Preparation of Rubber Polymer A-1

50 parts by weight of ion exchange water was added to a nitrogen-substituted pressurized reactor, 0.3 parts by weight of sodium lauryl sulfate, 10 parts by weight of 1,3-butadiene, 0.3 parts by weight of tertiary dodecyl mercaptan, 1.5 parts by weight of methacrylic acid, and 0.1 parts by weight of potassium persulfate were added thereto at room temperature, stirring was performed for one hour, reaction was performed at an elevated reaction temperature of 70° C. for 4 hours, and 1.0 parts by weight of potassium hydroxide (5% solution) was added at a reactor temperature of 70° C. for one hour when a reaction polymerization conversion ratio reached 95%, to prepare a latex having pH of 10.5 and a particle diameter of 800 Å. Then, reaction was performed while further adding 90 parts by weight of 1,3-butadiene in a continuous addition manner for 10 hours, and at the same time, further adding an emulsion comprising 0.2 parts by weight of potassium rosinate, 0.2 parts by weight of benzoyl peroxide and 10 parts by weight of ion exchange water at 70° C. in a continuous addition manner for 10 hours. Then, reaction was continued for 6 hours while further adding 0.0003 parts by weight of ferrous sulfate, 0.05 parts by weight of dextrose, 0.04 parts by weight of sodium pyrophosphate and 0.3 parts by weight of tertiary butyl hydroperoxide at 80° C., and the reaction was then completed. A polymerization conversion ratio of the rubber latex thus obtained was 95% and a particle diameter thereof was 3,100 Å, and details of physical properties are shown in Table 1.

Preparation of Graft Copolymer B-1

65 parts by weight of the rubber polymer A-1, 60 parts by weight of ion exchange water, 0.2 parts by weight of potassium alkenyl dicarboxylate (product name: latemul ASK), 7.5 parts by weight of styrene, 2.5 parts by weight of acrylonitrile and 0.3 parts by weight of polyethylene glycol diacrylate were added to a nitrogen-substituted reactor, stirring was sufficiently performed at 25° C. and a reaction temperature was elevated to 50° C. Then, 0.08 parts by weight of tertiary butyl hydroperoxide, 0.003 parts by weight of ferric sulfate, 0.005 parts by weight of dextrose, 0.025 parts by weight of sodium pyrophosphate, and 2.5 parts by weight of ion exchange water were added to the reactor, and reaction was performed while elevating the reaction temperature to 65° C. for one hour. Then, an emulsion comprising 0.3 parts by weight of potassium alkenyl dicarboxylate, 18.75 parts by weight of styrene, 6.25 parts by weight of acrylonitrile, 0.4 parts by weight of tertiary dodecyl mercaptan, 0.1 parts by weight of diisopropylbenzene peroxide, and 20 parts by weight of ion exchange water were continuously added to the reactor for one hour. Then, 0.05 parts by weight of cumene hydroperoxide, 0.003 parts by weight of ferrous sulfate, 0.005 parts by weight of dextrose, 0.025 parts by weight of sodium pyrophosphate, and 2.5 parts by weight of ion exchange water were further added to the reactor, and reaction was continued at an elevated polymerization temperature of 80° C. for one hour and was then completed. A final reaction conversion ratio was 98%, a polymerization coagulum was 0.02%, and details of physical properties are shown in Table 1.

Preparation of Rubber-Reinforced Thermoplastic Resin C-1

With respect to 23 parts by weight of the graft copolymer B-1 prepared by an aggregation drying process, 76.5 parts by weight of a styrene-acrylonitrile copolymer resin (92HR-LG CHEM.), 1.5 parts by weight of a lubricant, and 0.2 parts by weight of a primary heat stabilizer were added to the reactor, the mixture was extruded at a temperature of 200° C. and was then injected at the same temperature, to prepare a sample for physical property testing, and physical properties thereof are shown in Table 1.

Example 2

Preparation of Rubber Polymer A-2

50 parts by weight of ion exchange water was added to a nitrogen-substituted pressurized reactor, 0.3 parts by weight of sodium lauryl sulfate, 10 parts by weight of styrene, 0.3 parts by weight of tertiary dodecyl mercaptan, 1.5 parts by weight of methacrylic acid, and 0.1 parts by weight of potassium persulfate were added thereto at room temperature, stirring was performed for one hour, reaction was performed at an elevated reaction temperature of 70° C. for 4 hours, 1.0 parts by weight of potassium hydroxide (5% solution) was added at the reaction temperature of 70° C. for one hour when a reaction polymerization conversion ratio reached 92%, to prepare a seed latex having pH of 10.5 and a particle diameter of 600 Å. Then, reaction was performed while further adding parts by weight of 1,3-butadiene in a continuous addition manner for 10 hours, and at the same time, further adding an emulsion comprising 0.2 parts by weight of potassium rosinate, 0.2 parts by weight of benzoyl peroxide, and 10 parts by weight of ion exchange water at 70° C. in a continuous addition manner for 10 hours. Then, reaction was continued for 6 hours while further adding 0.0003 parts by weight of ferrous sulfate, 0.05 parts by weight of dextrose, 0.04 parts by weight of sodium pyrophosphate and 0.3 parts by weight of tertiary butyl hydroperoxide at 80° C., and the reaction was then completed. A polymerization conversion ratio of the rubber latex thus obtained was 96%, a particle diameter thereof was 3,300 Å, and details of physical properties are shown in Table 1.

Preparation of Graft Copolymer B-2

A graft copolymer was prepared in the same manner as in Example 1, except that the prepared rubber polymer A-2 was used. Details of physical properties are shown in Table 1.

Preparation of Rubber-Reinforced Thermoplastic Resin C-2

A rubber-reinforced thermoplastic resin was prepared in the same manner as in Example 1, except that the prepared graft copolymer B-2 was used. Details of physical properties are shown in Table 1.

Comparative Example 1

Rubber Polymer A-3

80 parts by weight of ion exchange water was added to a nitrogen-substituted pressurized reactor, 1.0 parts by weight of potassium fatty acid, 1.5 parts by weight of potassium rosinate, and 1.0 parts by weight of potassium carbonate were added at room temperature, stirring was performed, 80 parts by weight of 1,3-butadiene, 0.3 parts by weight of tertiary dodecyl mercaptan and 0.3 parts by weight of potassium persulfate were batch-added, a reaction temperature was elevated to 70° C., reaction was performed for 8 hours, 20 parts by weight of 1,3-butadiene, 1.0 parts by weight of potassium rosinate and 0.2 parts by weight of potassium persulfate were further batch-added when a reaction polymerization conversion ratio reached 70%, and reaction was further performed for 6 hours. Then, 0.5 parts by weight of potassium rosinate, and 0.2 parts by weight of potassium persulfate were batch added, and polymerization was further performed for 6 hours while elevating a reaction temperature to 80° C. Then, 4 parts by weight of ion exchange water, 0.5 parts by weight of potassium rosinate and 0.2 parts by weight of potassium persulfate were added, and reaction was further performed at 80° C. for 4 hours and was then completed. A polymerization conversion ratio of a diene rubber latex thus obtained was 92%, a particle diameter thereof was 3,100 Å, and details of physical properties are shown in Table 1.

Preparation of Graft Copolymer B-3

A graft copolymer was prepared in the same manner as in Example 1, except that the prepared rubber polymer A-3 was used. Details of physical properties are shown in Table 1.

Preparation of Rubber-Reinforced Thermoplastic Resin C-3

A rubber-reinforced thermoplastic resin was prepared in the same manner as in Example 1, except that the prepared graft copolymer B-3 was used. Details of measured physical properties are shown in Table 1.

Comparative Example 2

Rubber Polymer A-4

80 parts by weight of ion exchange water was added to a nitrogen-substituted pressurized reactor, 0.5 parts by weight of potassium fatty acid, 0.7 parts by weight of potassium rosinate and 1.0 parts by weight of potassium carbonate were added at room temperature, stirring was performed, 80 parts by weight of 1,3-butadiene, 0.3 parts by weight of tertiary dodecyl mercaptan and 0.3 parts by weight of potassium persulfate were batch-added, a reaction temperature was elevated to 70° C., reaction was performed for 8 hours, 20 parts by weight of 1,3-butadiene, 0.5 parts by weight of potassium rosinate and 0.2 parts by weight of potassium persulfate were further batch-added when a reaction polymerization conversion ratio reached 70%, and reaction was further performed for 6 hours. Then, 0.25 parts by weight of potassium rosinate and 0.2 parts by weight of potassium persulfate were batch added, and polymerization was further performed for 6 hours while elevating a reaction temperature to 80° C. Then, 4 parts by weight of ion exchange water, 0.25 parts by weight of potassium rosinate and 0.2 parts by weight of potassium persulfate were added, and reaction was further performed at 80° C. for 4 hours and was then completed. A polymerization conversion ratio of a diene rubber latex thus obtained was 88%, a particle diameter thereof was 3,500 Å, and details of physical properties are shown in Table 1.

Preparation of Graft Copolymer B-4

A graft copolymer was prepared in the same manner as in Example 1, except that the prepared rubber polymer A-4 was used. Details of physical properties are shown in Table 1.

Preparation of Rubber-Reinforced Thermoplastic Resin C-4

A rubber-reinforced thermoplastic resin was prepared in the same manner as in Example 1, except that the prepared graft copolymer B-4 was used. Details of measured physical properties are shown in Table 1.

Experimental Example

Properties of the rubber polymer, the graft copolymer and the rubber-reinforced thermoplastic resin composition prepared in accordance with the present invention will be measured by the following method.

[Physical Property Measurement Method]

Measurement of latex particle diameter: weight average particle diameter was measured using a Nocomp apparatus.

Polymerization coagulum: latex prepared by an emulsion polymerization method was filtered through a 100 mesh wire net filter, a polymer trapped in the wire net was dried in a 100° C. hot air dryer for one hour, and a ratio of a theoretical sum of total monomers added and additives (such as emulsifying agent) to a polymerization coagulum was calculated.

Izod impact strength: measured by ASTM D256 (the thickness of a sample: ¼", unit: kg·cm/cm).

Gloss: a pellet obtained from an extruder was injected at 200° C. to give a sample and gloss of the sample was measured with respect to a 20 degree light source.

Retention discoloration: a pellet obtained from an extruder was retained in an injector for 20 minutes at 270° C. to give a glossy sample, L, a and b color values of the glossy sample were obtained using a suga color computer and were compared with color values of a glossy sample injected at 200° C., and discoloration upon retention was calculated by the following Equation 1.

$$\Delta B = \sqrt{(L'-L)^2 + (a'-a)^2 + (b'-b)^2}$$ Equation 1

Retention gloss: A pellet obtained from an extruder was retained in an injector for 20 minutes at 270° C. to give a glossy sample, gloss at 45° was measured using a gloss meter in accordance with ASTM D528 and a difference in gloss between the glossy sample and a sample obtained by injection at 200° C. was represented as percentage.

Flowability: measured by ASTM D1238 under the conditions of 220° C. and 10 kg.

Latex stability: latex stability of rubber polymer was obtained by filtering 500 g of a final polymer latex using a 100 mesh net, allowing the polymer latex to stand in a homo-mixer (T.K. Robomics) at 10,000 RPM for 60 minutes, and a ratio of a theoretical total solid content to a coagulum trapped in the 100 mesh net was recorded as percentage. Furthermore, in a case of the graft copolymer, a time at which the polymer is coagulated at 15,000 RPM was measured and recorded, and polymers having a coagulation time longer than 60 minutes were classified into stable latex.

As can be seen from Table above, polymerization coagulum and latex stability were good even at a low emulsifying agent content in the preparation of a rubber latex and a graft copolymer, and a rubber-reinforced thermoplastic resin composition using the graft copolymer according to the present invention exhibited superior heat discoloration stability and retention gloss.

INDUSTRIAL APPLICABILITY

According to the present invention, unlike a conventional method, polymerization coagulum and latex stability were good even at a low emulsifying agent content in the preparation of a rubber latex and a graft copolymer, and a rubber-reinforced thermoplastic resin composition using the graft copolymer according to the present invention exhibited superior heat discoloration stability and retention gloss.

The invention claimed is:

1. A method for preparing a rubber polymer by emulsion polymerization comprising:
   (a) performing polymerization in the presence of a monomer, an unsaturated carboxylic acid, an emulsifying agent, a polymerization initiator and a molecular weight modifier, and continuously adding a basic solution thereto to prepare a seed polymer; and
   (b) continuously adding the seed polymer, a monomer, a polymerization initiator and an emulsifying agent and performing polymerization to grow the seed polymer.

2. The method according to claim 1, wherein the basic solution is added in an amount of 0.5 to 10 parts by weight, with respect to 100 parts by weight of the total monomer of the step (a).

3. The method according to claim 1, wherein the basic solution is a 0.1 to 30 wt % basic aqueous solution.

4. The method according to claim 1, wherein the basic solution is added when a polymerization conversion ratio is 90% or more.

5. The method according to claim 1, wherein the unsaturated carboxylic acid comprises at least one selected from the group consisting of acrylic acid, maleic acid, methacrylic acid, itaconic acid and fumaric acid.

6. The method according to claim 1, wherein the basic solution is a sodium hydroxide solution or a potassium hydroxide solution.

7. The method according to claim 1, wherein, as the emulsifying agent, one selected from the group consisting of

TABLE 1

|  |  | Ex. 1 | Ex. 2 | Comp. Ex. 1 | Comp. Ex. 2 |
|---|---|---|---|---|---|
| Rubber polymer (A) | Polymerization conversion ratio (%) | 95 | 96 | 92 | 88 |
|  | Weight average particle diameter (Å) | 3,100 | 3,300 | 3,100 | 3,500 |
|  | Polymerization coagulum (%) | 0.02 | 0.03 | 0.05 | 2.5 |
|  | Latex stability (%) | <0.01 | <0.01 | <0.01 | 7.5 |
| Graft copolymer (B) | Polymerization conversion ratio (%) | 98 | 98 | 97 | 97 |
|  | Polymerization coagulum (%) | 0.03 | 0.03 | 0.03 | 3.6 |
|  | Latex stability (%) | <0.01 | <0.01 | <0.01 | 10.5 |
| Rubber-reinforced thermoplastic resin (C) | Impact strength (¼) | 25 | 23 | 24 | 15 |
|  | Flowability | 21 | 23 | 20 | 18 |
|  | Gloss (45 degrees) | 98 | 100 | 94 | 80 |
|  | Retention discoloration (Δ E) | 2.1 | 1.9 | 4.5 | 6.4 |
|  | Retention gloss (%) | 0.5 | 0.1 | 2.0 | 10 | potassium rosinate, potassium fatty acid, potassium alkenyl dicarboxylate, sodium lauryl sulfate, sodium dodecyl benzene sulfate, alkyl sulfate, alkyl ether sulfate, alkyl phenyl ether sulfate, alkyl benzene sulfonate, alkyl sulfonate and dialkyl sulfonate is used singly, or is used in combination with 10 to 20% by weight of a non-ionic emulsifying agent containing an ethylene oxide group.

8. The method according to claim 1, wherein the polymerization initiator of the step (a) is potassium persulfate, ammonium persulfate or sodium persulfate, and the polymerization initiator of the step (b) is selected from the group consisting of succinic peroxide, lauroyl peroxide, stearoyl peroxide, tertiary hexyl peroxy-2-ethyl hexanoate, tertiary butyl peroxy-2-ethyl hexanoate and benzoyl peroxide.

9. The method according to claim 1, wherein, as the monomer of the steps (a) and (b), 100 parts by weight of a diene monomer, or 100% parts by weight of a monomer mixture comprising 50 to 90% by weight of the diene monomer and 10 to 50% by weight of at least one monomer selected from the group consisting of a acrylic acid ester monomer, an aromatic vinyl compound monomer and a vinyl cyanide compound monomer is subjected to emulsion polymerization.

10. The method according to claim 9, wherein the diene monomer comprises at least one selected from the group consisting of 1,3-butadiene, isoprene, 2-chloro-1,3-butadiene and chloroprene, the acrylic acid ester monomer comprises at least one selected from the group consisting of methyl acrylate, ethyl acrylate, butyl acrylate and 2-ethylhexyl acrylate, the aromatic vinyl compound comprises at least one selected from the group consisting of styrene, alpha-methyl styrene, chlorostyrene and vinyl toluene, and the vinyl cyanide compound comprises at least one selected from the group consisting of acrylonitrile, methacrylonitrile and malononitrile.

11. The method according to claim 1, wherein the polymerization initiator comprises at least one selected from the group consisting of succinic peroxide, lauroyl peroxide, stearoyl peroxide, tertiary hexyl peroxy-2-ethyl hexanoate, tertiary butyl peroxy-2-ethyl hexanoate, benzoyl peroxide, diisopropylbenzene hydroperoxide, cumene hydroperoxide and tertiary butyl hydroperoxide.

12. A method for preparing a rubber-reinforced graft copolymer comprising:
  i) preparing a rubber polymer by emulsion polymerization comprising:
    (a) performing polymerization in the presence of a monomer, an unsaturated carboxylic acid, an emulsifying agent, a polymerization initiator and a molecular weight modifier, and continuously adding a basic solution thereto to prepare a seed polymer; and
    (b) continuously adding the seed polymer, a monomer, a polymerization initiator and an emulsifying agent and performing polymerization to grow the seed polymer, and
  ii) preparing a polymer having a core-shell structure by emulsion-polymerizing a mixture comprising 50 to 70 parts by weight of the rubber polymer and 30 to 50 parts by weight of at least one monomer selected from the group consisting of a vinyl aromatic compound, a vinyl cyanide compound and a (meth)acrylic acid ester compound.

13. The method according to claim 12, wherein the vinyl cyanide compound or the (meth)acrylic acid ester compound is present in an amount of 10 to 40% by weight, with respect to 100 parts by weight of the total monomer used for the preparation of the rubber-reinforced graft copolymer.

14. The method according to claim 12, wherein the vinyl aromatic compound comprises at least one selected from the group consisting of α-methyl styrene, o-ethyl styrene, p-ethyl styrene and vinyl toluene, the vinyl cyanide compound is acrylonitrile or methacrylonitrile, and the (meth)acrylic acid ester comprises at least one selected from the group consisting of methyl methacrylate, ethyl methacrylate, methyl acrylate, ethyl acrylate and butyl acrylate.

* * * * *